United States Patent
Martin et al.

(10) Patent No.: US 12,037,669 B1
(45) Date of Patent: Jul. 16, 2024

(54) METAL-ALLOY BIPHASIC SYSTEMS, AND POWDERS AND METHODS FOR MAKING METAL-ALLOY BIPHASIC SYSTEMS

(71) Applicant: HRL Laboratories, LLC, Malibu, CA (US)

(72) Inventors: John H. Martin, Oxnard, CA (US); Julie Miller, Los Angeles, CA (US); Brennan D. Yahata, Los Angeles, CA (US); Jacob M. Hundley, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/784,890

(22) Filed: Feb. 7, 2020

Related U.S. Application Data

(60) Provisional application No. 62/944,779, filed on Dec. 6, 2019, provisional application No. 62/828,606, filed on Apr. 3, 2019.

(51) Int. Cl.
    *C22C 9/00*      (2006.01)
    *B22F 9/02*      (2006.01)
    (Continued)

(52) U.S. Cl.
    CPC ............. *C22C 9/00* (2013.01); *B22F 9/02* (2013.01); *B23K 26/342* (2015.10); *B33Y 70/00* (2014.12);
    (Continued)

(58) Field of Classification Search
    None
    See application file for complete search history.

(56) References Cited

U.S. PATENT DOCUMENTS

| | | | |
|---|---|---|---|
| 4,600,448 A | * | 7/1986 | Schmidt ............... C22C 9/00 148/407 |
| 10,030,292 B2 | | 7/2018 | Martin et al. |

(Continued)

FOREIGN PATENT DOCUMENTS

CN          106834774         *   6/2017

OTHER PUBLICATIONS

Tschopp et al., "Bulk Nanocrystalline Metals", May 13, 2014, Minerals, Metals & Materials Society, vol. 66 No. 6, pp. 1000-1019. (Year: 2014).*

(Continued)

*Primary Examiner* — Xiaobei Wang
(74) *Attorney, Agent, or Firm* — O'Connor & Company; Ryan P. O'Connor

(57) ABSTRACT

Some variations provide a metal-alloy biphasic system containing a first metal $M^1$ and a second metal $M^2$, wherein a second metal phase has a melting temperature lower than that of a first metal phase, and wherein the metal-alloy biphasic system has a hierarchical microstructure containing a second length scale that is at least one order of magnitude smaller than a first length scale. Some variations provide a metal-alloy biphasic system containing a first metal $M^1$ and a second metal $M^2$, wherein a second metal phase has a melting temperature lower than that of a first metal phase, and wherein the first metal phase forms a continuous network. Other variations provide a metal-alloy biphasic powder containing at least a first metal and a second metal, wherein the solubility of first metal in second metal is less than 5%. Methods of making and using the powders and biphasic system are disclosed.

16 Claims, 5 Drawing Sheets

(51) Int. Cl.
  *B23K 26/342* (2014.01)
  *B33Y 70/00* (2020.01)
  *C22C 5/02* (2006.01)
  *C22C 5/06* (2006.01)
  *C22C 11/00* (2006.01)
  *C22C 12/00* (2006.01)
  *C22C 13/00* (2006.01)
  *C22C 14/00* (2006.01)
  *C22C 16/00* (2006.01)
  *C22C 18/00* (2006.01)
  *C22C 19/03* (2006.01)
  *C22C 19/07* (2006.01)
  *C22C 21/00* (2006.01)
  *C22C 22/00* (2006.01)
  *C22C 27/00* (2006.01)
  *C22C 27/02* (2006.01)
  *C22C 27/04* (2006.01)
  *C22C 27/06* (2006.01)
  *C22C 28/00* (2006.01)
  *C22C 38/00* (2006.01)
  *C22C 49/14* (2006.01)
  *B33Y 10/00* (2015.01)

(52) U.S. Cl.
  CPC .............. *C22C 5/02* (2013.01); *C22C 5/06* (2013.01); *C22C 11/00* (2013.01); *C22C 12/00* (2013.01); *C22C 13/00* (2013.01); *C22C 14/00* (2013.01); *C22C 16/00* (2013.01); *C22C 18/00* (2013.01); *C22C 19/03* (2013.01); *C22C 19/07* (2013.01); *C22C 21/00* (2013.01); *C22C 22/00* (2013.01); *C22C 27/00* (2013.01); *C22C 27/02* (2013.01); *C22C 27/04* (2013.01); *C22C 27/06* (2013.01); *C22C 28/00* (2013.01); *C22C 38/00* (2013.01); *C22C 49/14* (2013.01); *B22F 2304/10* (2013.01); *B33Y 10/00* (2014.12)

(56) References Cited

U.S. PATENT DOCUMENTS

| | | | |
|---|---|---|---|
| 10,682,699 B2 | 6/2020 | Martin et al. | |
| 2005/0092400 A1* | 5/2005 | Botcharova | C22C 1/0425 148/432 |
| 2010/0055487 A1* | 3/2010 | Zimmermann | C22C 30/00 428/548 |
| 2015/0135897 A1* | 5/2015 | Sutcliffe | B23K 15/0086 206/524.1 |
| 2017/0014937 A1 | 1/2017 | Wilhelmy et al. | |
| 2017/0312857 A1* | 11/2017 | Bourell | B22F 1/09 |
| 2018/0010215 A1 | 1/2018 | Sanaty-Zedah et al. | |
| 2018/0133790 A1* | 5/2018 | Yahata | C22C 21/02 |
| 2018/0141120 A1* | 5/2018 | Storck | B22F 1/0018 |
| 2019/0032175 A1 | 1/2019 | Martin et al. | |
| 2019/0040495 A1* | 2/2019 | Yoon | C22C 30/00 |
| 2019/0040503 A1 | 2/2019 | Martin et al. | |
| 2019/0291182 A1 | 9/2019 | Bobel et al. | |
| 2020/0078861 A1* | 3/2020 | Sungail | A61L 31/022 |
| 2020/0123640 A1 | 4/2020 | Bobel et al. | |
| 2021/0016348 A1* | 1/2021 | Sungail | C22C 27/02 |

OTHER PUBLICATIONS

PCT/US2019/050542 Written Opinion of the International Searching Authority, dated Jul. 1, 2020.
Martin et al., "3D printing of high-strength aluminium alloys", Nature vol. 548, pp. 365-369 and extended data, Sep. 21, 2017.

* cited by examiner

Refined Transpiration Spacing

METAL-ALLOY BIPHASIC SYSTEMS, AND POWDERS AND METHODS FOR MAKING METAL-ALLOY BIPHASIC SYSTEMS

PRIORITY DATA

This patent application is a non-provisional application with priority to U.S. Provisional Patent App. No. 62/828,606, filed on Apr. 3, 2019, and to U.S. Provisional Patent App. No. 62/944,779, filed on Dec. 6, 2019, each of which is hereby incorporated by reference herein.

FIELD OF THE INVENTION

The present invention generally relates to biphasic metal-containing materials and structures.

BACKGROUND OF THE INVENTION

Metal alloys are well-known materials with a wide variety of industrial and consumer applications globally, such as aerospace vehicles, automobiles, buildings, and tools. In some cases, a combination of metals may reduce the overall cost of the material while preserving important properties. In other cases, the combination of metals imparts synergistic properties to the constituent metal elements, such as corrosion resistance or mechanical strength.

Metal alloys typically include a single parent material/phase with solutes that provide solid solution strengthening or form small discontinuous strengthening elements. The distribution of solutes is normally homogenous through the entire structure. In some cases, a structure is surface-modified through external line-of-sight post-processing (e.g., shot peening, a cold-working technique to produce a compressive residual stress layer).

Metal alloys containing at least two immiscible materials can provide interesting properties including thermal stability, diffusion boundaries, and increased strength due to decreased dislocation between phases. Such metal alloys are referred to herein as "biphasic materials" or "biphasic alloys." Biphasic materials have been identified for high-strength, high-temperature aerospace and naval applications. Biphasic materials also have applicability in high-flux nuclear reactors, where the large number of phase interfaces act as dislocation sinks for recovery from radiation damages to the reactor material. In other cases, a biphasic material may act as a scaffold for transpiration cooling or other pressure-driven or capillary-driven flow applications.

Current production of biphasic materials is mostly focused on layered structures fabricated with chemical vapor deposition (CVD) or physical vapor deposition (PVD), which are slow and very limited in size; or accumulative roll bonding, which is faster than CVD and PVD but limited in geometric flexibility to two-dimensional (2D) prismatic geometries. Generally, known layer approaches are limited to 2D architectures in the form of a plate material, making the use of these systems limited, especially when three-dimensional (3D) geometries are desired.

Other known techniques for producing biphasic materials employ powder processing. While powder processing provides greater flexibility than the above-described layer approaches, there have been severe processing limitations regarding microstructural control and features. In particular, conventional powder processing has conventionally been unable to generate biphasic materials having a continuous biphasic network, especially a network of a high-temperature metal in the alloy.

For example, a tungsten-copper alloy is a popular biphasic material but conventionally relies on sintering of copper powder around a powder of tungsten, yielding copper-coated, discrete tungsten particles, rather than a continuously connected tungsten phase. Ball milling of copper and tantalum provides a small length scale of immiscible tantalum, but ball milling is limited in process control and resulting microstructures. Ball milling generates discrete tantalum particulates, not a continuously connected tantalum phase. Other known techniques for producing biphasic materials employ stochastic, disconnected powder compactions.

There is no currently known powder approach that can provide high connectivity of the higher-temperature metal phase to produce a continuous biphasic network. Powder processing heretofore does not provide architecture control for convenient fabrication of a 3D continuous biphasic network. What are desired are powder feedstocks and methods to enable hierarchical architecture control for metal-alloy biphasic materials, and metal-alloy biphasic systems fabricated therefrom.

SUMMARY OF THE INVENTION

The present invention addresses the aforementioned needs in the art, as will now be summarized and then further described in detail below.

Some variations of the invention provide a metal-alloy biphasic system containing at least a first metal phase and a second metal phase, wherein the first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

wherein the second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

wherein the first metal phase is characterized by a first melting temperature, and wherein the second metal phase is characterized by a second melting temperature that is lower than the first melting temperature; and wherein the metal-alloy biphasic system is characterized by a hierarchical microstructure containing a first length scale and a second length scale that is at least one order of magnitude smaller than the first length scale.

In some embodiments, the metal-alloy biphasic system contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof.

In some embodiments, the second length scale is at least two orders of magnitude smaller than the first length scale. The first length scale may be from about 1 micron to about 100 microns, and the second length scale may be from about 0.01 microns to about 1 micron, for example.

The metal-alloy biphasic system may contain more than two distinct phases, such as three phases, four phases, or more.

In some embodiments, the metal-alloy biphasic system contains a non-metal phase in addition to the first metal phase, the second metal phase, and any additional metal phases.

In preferred embodiments, at least one of the first metal phase or the second metal phase forms a continuous network within the hierarchical microstructure. In some embodiments, the first metal phase forms a continuous network within the hierarchical microstructure. In certain embodiments, the first metal phase forms a first continuous network within the hierarchical microstructure, and the second metal phase forms a second continuous network within the hierarchical microstructure.

The metal-alloy biphasic system may be an additively manufactured structure with a scalloped build pattern. Alternatively, or additionally, the metal-alloy biphasic system may be a melt-solidified structure. Alternatively, the metal-alloy biphasic system may be an arc-welded structure.

Some variations provide a method of producing a metal-alloy biphasic system, said method comprising:

(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

(c) processing said first powder and said second powder using a technique selected from the group consisting of additive manufacturing, directional solidification, direct-chill casting, conventional casting, welding, sintering, and combinations thereof; and (d) obtaining a metal-alloy biphasic system containing at least a first metal phase and a second metal phase, wherein the first metal phase consists of $M^1$, and wherein the second metal phase consists of $M^2$, wherein the first metal phase is characterized by a first melting temperature, and wherein the second metal phase is characterized by a second melting temperature that is lower than the first melting temperature; and wherein the metal-alloy biphasic system is characterized by a hierarchical microstructure containing a first length scale and a second length scale that is at least one order of magnitude smaller than the first length scale.

Some variations of the invention provide a metal-alloy biphasic system containing at least a first metal phase and a second metal phase, wherein the first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

wherein the second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

wherein the first metal phase is characterized by a first melting temperature, and wherein the second metal phase is characterized by a second melting temperature that is lower than the first melting temperature; and wherein the first metal phase forms a first continuous network within the metal-alloy biphasic system.

In some embodiments, the second metal phase also forms a (second) continuous network within the metal-alloy biphasic system.

In some embodiments, the metal-alloy biphasic system contains three or more distinct phases, in which case the three or more distinct phases may all form continuous networks within the metal-alloy biphasic system. The metal-alloy biphasic system may contain a non-metal-containing phase.

The metal-alloy biphasic system may contain $M^1$-$M^2$ selected from the group consisting of Nb—Cu, W—Cu, Ta—Cu, Al—Bi, W—Ce, Mo—Ce, Mo—Cu, and combinations thereof.

The weight ratio of the first metal phase to the second metal phase may be selected from about 0.01 to about 100, such as from about 0.05 to about 20, for example.

In some embodiments, the metal-alloy biphasic system contains a spatial gradient in the weight ratio of the first metal phase to the second metal phase.

The metal-alloy biphasic system may be an additively manufactured structure with a scalloped build pattern. Alternatively, or additionally, the metal-alloy biphasic system may be a melt-solidified structure. Alternatively, the metal-alloy biphasic system may be an arc-welded structure.

Some variations provide a method of producing a metal-alloy biphasic system, the method comprising:

(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

(c) processing the first powder and the second powder using a technique selected from the group consisting of additive manufacturing, directional solidification, direct-chill casting, conventional casting, welding, sintering, and combinations thereof; and (d) obtaining a metal-alloy biphasic system containing at least a first metal phase and a second metal phase, wherein the first metal phase consists of $M^1$, and wherein the second metal phase consists of $M^2$, wherein the first metal phase is characterized by a first melting temperature, and wherein the second metal phase is characterized by a second melting temperature that is lower than the first melting temperature; and wherein the first metal phase forms a first continuous network within the metal-alloy biphasic system.

Other variations of the invention provide a metal-containing scaffold system comprising a metal-containing first phase and a second phase, wherein the metal-containing first phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

wherein the second phase contains porous empty space or a material selected from the group consisting of a second metal, a metal oxide, a non-metal oxide, water, a non-aqueous liquid, a polymer, a gas, and combinations thereof; and wherein the metal-containing scaffold system is characterized by a hierarchical microstructure containing a first length scale and a second length scale that is at least one order of magnitude smaller than the first length scale.

In some embodiments, the second length scale is at least two orders of magnitude smaller than the first length scale. For example, the first length scale may be from about 1 micron to about 100 microns, and/or the second length scale may be from about 0.01 microns to about 1 micron.

In some embodiments, the metal-containing first phase forms a continuous network within the hierarchical microstructure. In certain embodiments, the metal-containing first phase forms a first continuous network within the hierarchical microstructure, and the second phase also forms a (second) continuous network within the hierarchical microstructure.

Some variations provide a method of producing a metal-containing scaffold system comprising a metal-containing first phase and a second phase, the method comprising:
(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;
(c) processing the first powder and the second powder using a technique selected from the group consisting of additive manufacturing, directional solidification, direct-chill casting, conventional casting, welding, sintering, and combinations thereof;
(d) obtaining a metal-alloy biphasic system containing at least a first metal phase and a second metal phase, wherein the first metal phase consists of $M^1$, and wherein the second metal phase consists of $M^2$; and
(e) replacing at least a portion of one of the first metal phase or the second metal phase with porous empty space or a material selected from the group consisting of a second metal, a metal oxide, a non-metal oxide, water, a non-aqueous liquid, a polymer, a gas, and combinations thereof,
wherein the metal-containing scaffold system is characterized by a hierarchical microstructure containing a first length scale and a second length scale that is at least one order of magnitude smaller than the first length scale.

Some variations of the invention provide a metal-alloy biphasic powder containing at least a first metal material and a second metal material,
wherein the metal-alloy biphasic powder has an average particle size selected from about 10 nanometers to about 1 millimeter;
wherein the first metal material consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
wherein the second metal material consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein $M^2$ is different than $M^1$;
wherein the first metal material is characterized by a first melting temperature, and the second metal material is characterized by a second melting temperature that is lower than the first melting temperature; and
wherein the solubility of the first metal material in the second metal material is less than 5% at the second melting temperature.

In some embodiments, the solubility of the second metal material in the first metal material is less than 5% at the second melting temperature.

The first metal material may be a first metal or a first metal alloy. The second metal material may be a second metal or a second metal alloy. In some embodiments, the first metal material is a first metal alloy and the second metal material is a second metal alloy that is immiscible in the first metal alloy.

In some embodiments, $M^1$ is selected from the group consisting of Group 5 elements and Group 6 elements, and $M^2$ is selected from Group 11 elements.

In certain embodiments, the metal-alloy biphasic powder contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof.

Some variations provide a method of producing a metal-alloy biphasic powder, said method comprising:
(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein said first powder has an average particle size selected from about 10 nanometers to about 1 millimeter;
(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal, and wherein said second powder has an average particle size selected from about 10 nanometers to about 1 millimeter;
(c) processing said first powder and said second powder using a technique selected from the group consisting of high-energy milling, gas atomization, plasma atomization, plasma spheroidization, and combinations thereof; and
(d) obtaining a metal-alloy biphasic powder containing at least $M^1$ and $M^2$, wherein $M^1$ is characterized by a first melting temperature, and $M^2$ is characterized by a second melting temperature that is lower than the first melting temperature; and
wherein the solubility of $M^1$ in $M^2$ is less than 5% at the second melting temperature.

DETAILED DESCRIPTION OF EMBODIMENTS OF THE INVENTION

Figure 1:
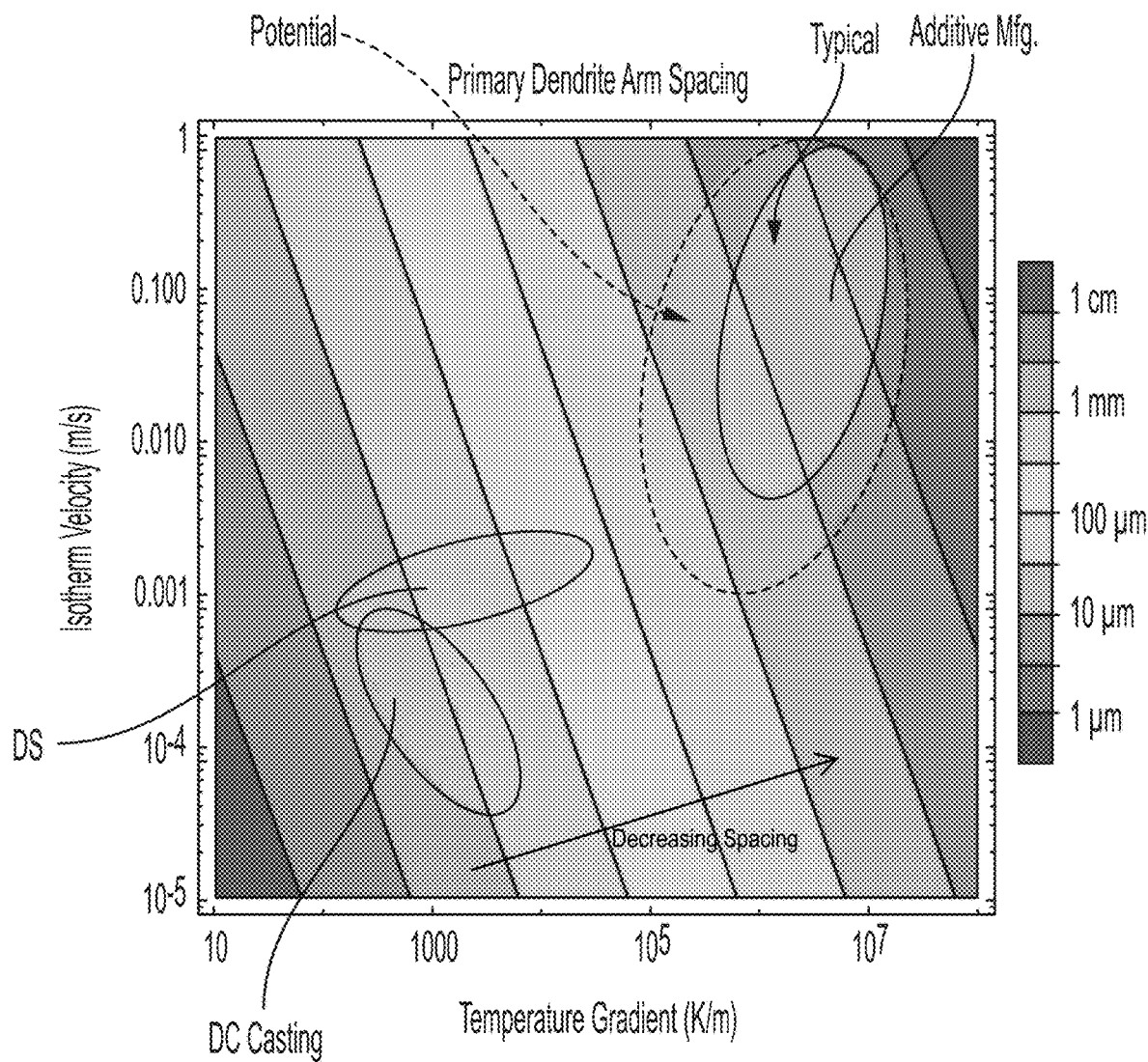
FIG. 1 is a diagram depicting the additive-manufacturing parameter space that enables control of solidification and primary dendrite arm spacing across two orders of magnitude, in some embodiments.

The compositions, structures, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Metal-Alloy Biphasic Systems

Some variations of the present invention provide an additively manufactured metal-alloy biphasic system comprising immiscible metals. The metal-alloy biphasic system structure may be applied widely to immiscible metal-alloy systems for the production of 3D-printed components of arbitrary geometry. Using the principles taught herein, immiscible metals may be processed using additive manufacturing to control the phase continuity and produce arbitrary geometric structures of high-value alloy systems that have heretofore been difficult to process (e.g., non-weldable systems).

Additive manufacturing allows local (small-scale) control of build parameters and solidification conditions. For example, the microstructure of a metal-alloy biphasic system may be controlled across multiple length scales based on solidification conditions controlled by the selected and locally applied additive-manufacturing build parameters. Solidification conditions may be controlled to result in hierarchical control of biphasic structures. Also, solidification conditions may be controlled so that the microstructure of the metal-alloy biphasic system includes either connected or discrete biphasic constituents.

By "biphasic" it is meant that there are at least two metal phases. The metal-alloy biphasic system may contain more than two distinct metal phases, such as three metal phases, four metal phases, or more, which are referred to herein as biphasic for convenience of nomenclature. In some embodiments, biphasic materials are triphasic, quadriphasic, etc.

While additive manufacturing (3D printing) is explicitly discussed in this specification, the metal-alloy biphasic system structure may be produced via other melt and solidification processing routes, such as (but not limited to) directional solidification, direct-chill casting, conventional casting, and welding. The remainder of the specification will describe variations of the invention specific to additive manufacturing, but it will be understood that the principles disclosed herein may be applied to any metal processing that melts and solidifies at least a portion of a starting powder.

Some variations of the invention provide a metal-alloy biphasic system containing at least a first metal phase and a second metal phase, wherein the first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

wherein the second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

wherein the first metal phase is characterized by a first melting temperature, and wherein the second metal phase is characterized by a second melting temperature that is lower than the first melting temperature; and wherein the metal-alloy biphasic system is characterized by a hierarchical microstructure containing a first length scale and a second length scale that is at least one order of magnitude smaller than the first length scale.

Note that a "metal phase" may be a pure, single metal or may be a combination of metals or a metal alloy.

In some embodiments, the first metal phase specifically contains Cu, Nb, W, Mo, W, Ta, Al, Bi, Ce, Sn, Pb, alloys thereof, or combinations of the foregoing. In these or other embodiments, the second metal phase specifically contains Cu, Nb, W, Mo, W, Ta, Al, Bi, Ce, Sn, Pb, alloys thereof, or combinations of the foregoing.

In some embodiments, the metal-alloy biphasic system contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof. The notation "$M^1$-$M^2$" means that metals $M^1$ and $M^2$ are present in distinct phases of the metal alloy. A metal-alloy biphasic system may contain other components besides $M^1$-$M^2$, and the other component(s) may be soluble or insoluble in $M^1$ and/or in $M^2$.

In some embodiments, alloys of Nb, Mo, W, and/or Ta are utilized with immiscible Cu. For example, in certain embodiments, a solid solution of Nb and Ta forms a first metal phase, and Cu forms a second metal phase that is immiscible with the first metal phase. Various immiscible intermetallics may be employed.

In some embodiments, an alloy of a metal is an intermetallic compound. For example, in the case of the first metal $M^1$, an alloy may be $M^1X_3$, wherein X is a metal such as one selected from the group consisting of Zr, Ti, Hf, V, Ta, Nb, Cr, Mo, W, Al, Bi, Mn, Fe, Co, Ni, Cu, Ag, Au, Zn, Sn, Pb, Sc, Y, La, Ce, Pr, Nd, Sm, Eu, Gd, Tb, Dy, Ho, Er, Tm, Yb, Lu, and combinations thereof.

In certain embodiments in which the first metal phase is $M^1X_3$, X is $M^2$. In these embodiments, the second metal phase contains pure metal $M^2$ or a metal alloy containing $M^2$. The first metal phase is different than $M^1M^2_3$ since the first metal phase and second metal phase do not have the same composition.

Intermetallic compounds of $M^1$ may generally be $M^1_nX_m$ (n=1 to 15, m=1 to 15), wherein X is a metal such as one selected from the group consisting of Zr, Ti, Hf, V, Ta, Nb, Cr, Mo, W, Al, Bi, Mn, Fe, Co, Ni, Cu, Ag, Au, Zn, Sn, Pb, Sc, Y, La, Ce, Pr, Nd, Sm, Eu, Gd, Tb, Dy, Ho, Er, Tm, Yb, Lu, and combinations thereof. The value of n may be 1, 2, 3, 4, 5, 6, 7, 8, 9, 10, 11, 12, 13, 14, and/or 15. Independently, the value of m may be 1, 2, 3, 4, 5, 6, 7, 8, 9, 10, 11, 12, 13, 14, and/or 15. For example, in some embodiments, the intermetallic compounds of $M^1$ are $X_3M^1$ compounds (e.g., $Al_3Zr$, $Al_3Ti$, etc.).

Intermetallic compounds of $M^2$ may generally be $M^2_nX_m$ (n=1 to 15, m=1 to 15), wherein X is a metal such as one selected from the group consisting of Zr, Ti, Hf, V, Ta, Nb, Cr, Mo, W, Al, Bi, Mn, Fe, Co, Ni, Cu, Ag, Au, Zn, Sn, Pb, Sc, Y, La, Ce, Pr, Nd, Sm, Eu, Gd, Tb, Dy, Ho, Er, Tm, Yb, Lu, and combinations thereof. The value of n may be 1, 2, 3, 4, 5, 6, 7, 8, 9, 10, 11, 12, 13, 14, and/or 15. Independently, the value of m may be 1, 2, 3, 4, 5, 6, 7, 8, 9, 10, 11, 12, 13, 14, and/or 15. For example, in some embodiments, the intermetallic compounds of $M^2$ are $M^2_3X$ compounds (e.g., $Al_3Zr$, $Al_3Ti$, etc.).

For the first metal phase and/or the second metal phase, an alloy element may be selected from IUPAC (International Union of Pure and Applied Chemistry) Groups 3, 4, 5, 6, and/or lanthanide series of elements. In some embodiments, a metal alloy is a combination of one or more metals with one or more non-metallic elements.

In certain embodiments, the first metal phase is initially a solid solution of two or more metals and the second metal phase includes one or more metals. After a period of time allowing for diffusion and reaction, an intermetallic may form between one of the metals on the first phase and one of the metals in the second phase. The intermetallic itself may be soluble in the first metal phase and/or in the second metal phase, or may form a third metal phase that is immiscible with either of the first or second metal phases. Some systems are characterized by distinct phases on the phase diagram with little to no solubility in other phases and may be non-eutectic (e.g., Al—Si). A wide variety of material systems is possible in this invention.

In some embodiments, the metal-alloy biphasic system contains two primary elements that are not soluble with each, while containing other elements that have some solubility with one or both of the primary elements. An example is tin (Sn) with an aluminum alloy Al-7075 which contains about 90 wt % Al, about 6 wt % Zn, about 2-3 wt % Mg, and about 1-2 wt % Cu. Sn is somewhat soluble in Zn, Cu, and Mg, while Al and Sn are substantially insoluble with each other. A metal-alloy biphasic system comprising Al-7075 and Sn has biphasic character, but likely some of the Sn is solubilized in the Al-7075 and some of the Zn, Mg, and Cu (within the Al-7075 alloy) are solubilized in the Sn. In this example, the metal-alloy biphasic system contains Al as $M^1$, Sn as $M^2$, and further contains at least Zn, Cu, and Mg, wherein there is (a) a distinct Al or Al-rich phase and (b) a distinct Sn or Sn-rich phase.

In general, reference to a first metal phase, a second metal phase, and other phases (if applicable) is made in reference to the metal-alloy biphasic system at equilibrium. An equilibrium phase diagram such as a plot of temperature versus composition (e.g., FIG. 5) can be consulted, or readily constructed by a skilled artisan, for the metal-alloy biphasic system of interest. See Smithells Metals Reference Book, Eds. Gale and Totemeier, Eighth Edition, 2004, which is hereby incorporated by reference (along with all internal citations) for all purposes. In particular, chapter 11 of Smithells includes many binary equilibrium phase diagrams that are applicable to the present disclosure. When more than two elements are present in a system, equilibrium phase diagrams become complex due to thermodynamic interactions among all elements. One skilled in the materials-science art will understand that multicomponent phase diagrams may be found in the literature, or if not readily available, may be generated via experimentation.

At equilibrium, for a distinct "phase" to form, there needs to be at least some insolubility of the material in that distinct phase relative to the local composition at a given temperature. A metal phase does not require complete immiscibility with the rest of the material. For example, in the case where a biphasic system contains only a first metal phase and a second metal phase, the solubility of the first metal phase in the second metal phase may be from 0% to about 90%, such as less than 50%, less than 10%, less than 5%, less than 2%, or less than 1%, at a use temperature such as from 25° C. or higher. Likewise, the solubility of the second metal phase in the first metal phase may be from 0% to about 90%, such as less than 50%, less than 10%, less than 5%, less than 2%, or less than 1%, at a use temperature such as from 25° C. or higher. A system wherein the solubility of the first metal phase in the second metal phase is less than 0.1%, and wherein the solubility of the second metal phase in the first metal phase is less than 0.1%, may be considered as containing two completely immiscible phases.

In some embodiments, a metal phase is present in a biphasic system at a concentration high above its equilibrium solubility limit, such as 2×, 3×, 5×, 10×, 25×, 50×, or 100× of the equilibrium solubility calculated at a temperature of 750° C. and a pressure of 1 bar, for example.

Non-equilibrium phases may be present due to kinetic limitations (e.g., reaction kinetics and/or mass-transfer rates) that prevent equilibrium among all materials present. The present invention is not limited to any systems being at thermodynamic equilibrium and does not preclude non-equilibrium phases being present in any of the biphasic systems. In some cases, a non-equilibrium composition is desired. As is known, whether a metal alloy system will reach true thermodynamic equilibrium is dictated by kinetic constraints including temperature, time, and the presence of catalysts or nucleation sites. Even when a new phase is predicted in a phase diagram, atomic rearrangements via diffusion are necessary, and there is an increase in energy associated with the phase boundaries that are created between parent and product phases. That energy must be provided, via heat transfer. In some embodiments, additive manufacturing is carried out using an effective temperature profile and time such that the fabricated metal-alloy biphasic system has a composition predicted by equilibrium.

The first metal phase may be present in the metal-alloy biphasic system in a concentration from about 1 wt % to about 99 wt %, such as about 2, 5, 10, 20, 30, 40, 50, 60, 70, 80, 90, or 95 wt %. Independently, the second metal phase may be present in the metal-alloy biphasic system in a concentration from about 1 wt % to about 99 wt %, such as about 2, 5, 10, 20, 30, 40, 50, 60, 70, 80, 90, or 95 wt %. The desired concentration of a metal phase may be dictated by its density; less weight of a high-density metal phase may be used, for example, to reach a similar volumetric effect. The sum of concentrations of first metal phase and second metal phase may be from about 2 wt % to 100 wt %, such as about 5, 10, 15, 20, 25, 30, 40, 50, 60, 70, 80, 90, 95, 99, or 100 wt %.

The weight ratio of the first metal phase to the second metal phase may be selected from about 0.01 to about 100, such as from about 0.05 to about 20, for example. A typical weight ratio of the first metal phase to the second metal phase is 1.0, i.e. 50/50 by weight when no other components are present. Another typical weight ratio of the first metal phase to the second metal phase is 0.43, i.e. about 30/70 by weight when no other components are present. In various embodiments, the weight ratio of the first metal phase to the second metal phase is about 0.1, 0.2, 0.5, 1, 2, 3, 4, 5, 6, 7, 8, 9, 10, 15, 25, 35, 50, 65, or 75.

In some embodiments, the metal-alloy biphasic system contains a spatial gradient in the weight ratio of the first metal phase to the second metal phase. For example, in the case of a Nb—Cu metal-alloy biphasic system, a relatively high concentration of Nb may be incorporated at interfaces facing the environment, and a relatively low concentration of Nb (high Cu content) may be used in internal regions for ease of backfilling or as a well for a working fluid, for example. Another example is a W—Cu metal-alloy biphasic system, with similar design features as a Nb—Cu metal-alloy biphasic system, or other spatial gradients.

As stated above, the second metal phase is characterized by a second melting temperature that is lower than the first melting temperature. In various embodiments, the first melting temperature is selected from about 400° C. to about 4000° C., such as from about 1000° C. to about 3000° C., e.g., about, at least about, or at most about 400° C., 500° C., 600° ° C., 700° C., 800° C., 900° C., 1000° C., 1100° C., 1200° C., 1300° ° C., 1400° ° C., 1500° C., 1600° C., 1700° C., 1800° ° C., 1900° C., 2000° C., 2100° C., 2200° C., 2300° C., 2400° ° C., 2500° C., 2600° ° C., 2700° C., 2800° C., 2900° C., 3000° C., 3100° C., 3200° C., 3300° C., 3400° C., or 3500° C. In these or other embodiments, the second melting temperature is selected from about 250° ° C. to about 3000° C., such as from about 400° C. to about 2000° ° C., e.g., about, at least about, or at most about 300° C., 400° C., 500° C., 600° ° C., 700° C., 800° C., 900° C., 1000° C., 1100° C., 1200° C., 1300° C., 1400° ° C., 1500° C., 1600° C., 1700° C., 1800° C., 1900° C., 2000° C., 2100° C., 2200° C., 2300° C., 2400° C., 2500° C., 2600° C., 2700° C., 2800° C., 2900° ° C., or 3000° C.

The difference in first melting temperature T'm and second melting temperature $T^2_m$ may vary, such as $T^1_m - T^2_m$ from about 50° C. to about 2000° C. or more. In various embodiments, the difference $T^1_m - T^2_m$ is about, at least about, or at most about 50° C., 100° C., 200° C., 300° ° C., 400° C., 500° ° C., 600° C., 700° C., 800° C., 900° C., 1000° ° C., 1100° C., 1200° C., 1300° C., 1400° C., 1500° C., 1600° C., 1700° ° C., 1800° C., 1900° C., or 2000° C. In specific embodiments, the first melting temperature and second melting temperature are very close to each other, such as within 10°, 1° C., or 0.1° C.

Some metal alloys have multiple melting points, in which case one or more melting points may be as listed above. When the second metal phase is a metal alloy with multiple melting points, at least one of them is lower than the melting point of the first metal phase (or of the maximum melting point of the first metal phase if it is itself a metal alloy with multiple melting points).

The overall metal-alloy biphasic system, because it contains at least two distinct metal phases, is typically characterized by more than one melting temperature. In some embodiments, the melting temperature of the metal-alloy biphasic system is higher than the melting point of either of the first or second metal phases. In some embodiments, the melting temperature of the metal-alloy biphasic system is lower than the melting point of either of the first or second metal phases. In various embodiments, a melting temperature of the metal-alloy biphasic system is about, at least about, or at most about 300° C., 400° C., 500° C., 600° C., 700° C., 800° C., 900° C., 1000° C., 1100° ° C., 1200° C., 1300° ° C., 1400° C., 1500° C., 1600° C., 1700° C., 1800° C., 1900° C., 2000° C., 2100° C., 2200° ° C., 2300° C., 2400° C., 2500° C., 2600° ° C., 2700° C., 2800° C., 2900° ° C., 3000° C., 3100° C., 3200° C., 3300° C., 3400° C., 3500° C., 3600° ° C., 3700° C., 3800° C., 3900° C., or 4000° C.

The metal-alloy biphasic system further may comprise from about 0.1 wt % to about 15 wt % of one or more additional alloy elements selected from the group consisting of Zn, Si, Mg, Cu, Li, Ag, Mn, Fe, Co, Ni, Sn, Sb, Bi, Pb, B, C, Ir, Os, Re, Ca, Sr, Be, and combinations or alloys of any of the foregoing, wherein wt % is based on the total weight concentration, on an elemental basis, of the additional alloy elements. In various embodiments, the metal alloy comprises about, or at least about, 0.2, 0.5, 1, 2, 3, 4, 5, 6, 7, 8, 9, 10, 11, 12, 13, or 14 wt % of such one or more additional alloy elements.

The one or more additional alloy elements, when present, may be added for a wide variety of reasons. For example, elements such as Mn may provide solid solution strengthening, Mg and Zn may form $MgZn_2$ precipitates, Cu may form θ-phase precipitates, and Si may form immiscible Si structures. Typical precipitation additions (e.g., Mg, Zn, and/or Cu), as well as other less common precipitate systems and alloy additions (e.g., Fe, Co, Ni, Ag, Li, Sn, Sb, Bi, Pb, B, C, Ir, Os, Re, Ca, Sr, and/or Be) may be added to form not only strengthening precipitates, but also to dissolve at the desired operating temperature in order to provide solid solution strengthening. Additionally, these elements may segregate to precipitate boundaries, thereby decreasing the activity of these boundaries and providing an energy barrier that inhibits coarsening, giving improved properties at elevated temperatures for longer durations without microstructural degradation.

Non-metal components may also be present in the metal-alloy biphasic system. Such non-metal components may include ceramics, hydrides, carbides, oxides, nitrides, borides, sulfides, or combinations thereof (e.g., silicon carbide, silicon nitride, boron oxide, etc.).

In some embodiments, the metal-alloy biphasic system contains a non-metal phase in addition to the first metal phase, the second metal phase, and any additional metal phases. The non-metal-containing phase may contain, for example, an oxide such as a metal oxide, a liquid such as water, a polymer such as wax, or a vapor such as a gas (e.g., air, $N_2$, or $CO_2$).

Figure 2:
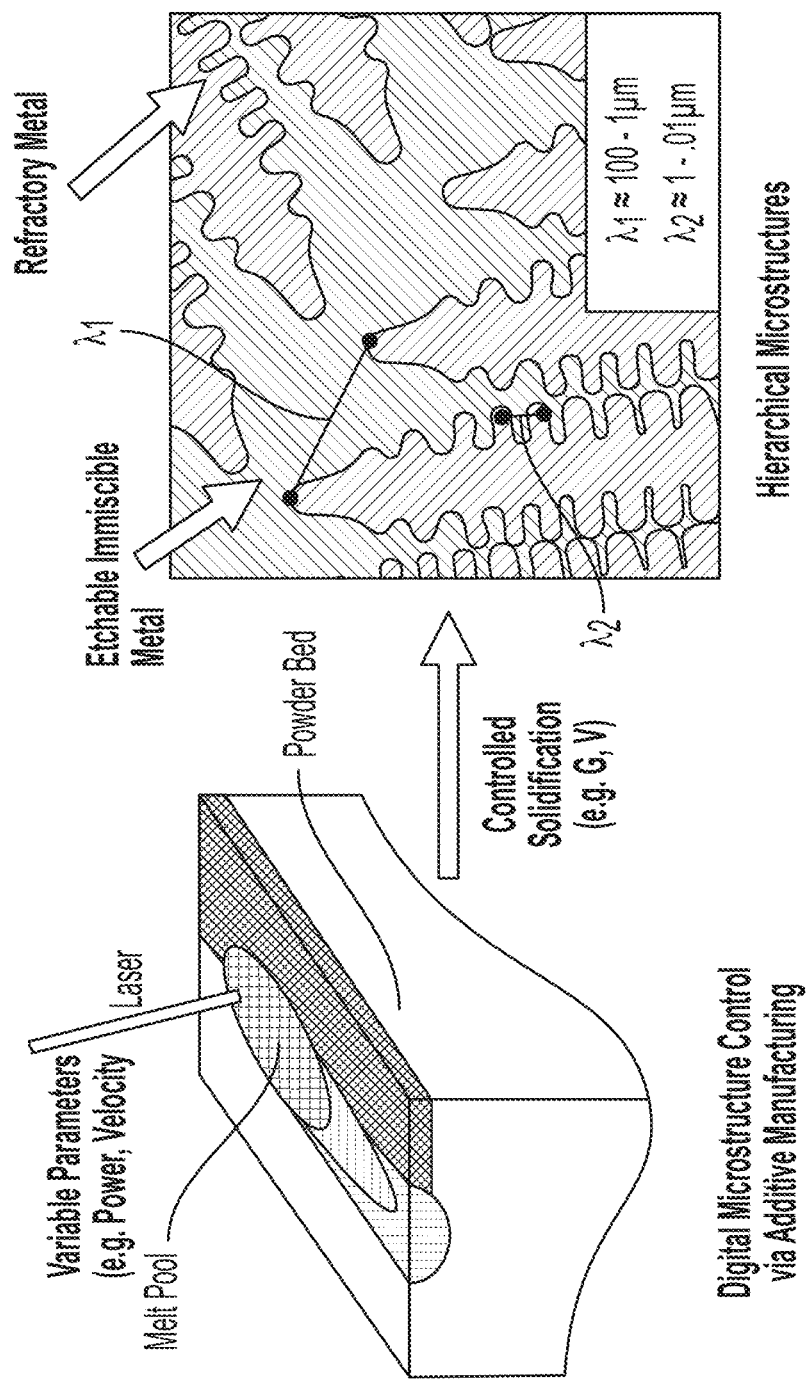
FIG. 2 is a schematic diagram depicting a typical additive-manufacturing process to fabricate a metal-alloy biphasic system, in some embodiments.

As intended herein, a "hierarchical microstructure" refers to the presence of two (or more) distinct length scales, wherein a first length scale is at least 2× larger than the second length scale. Preferably, the first length scale is at least 3×, 4×, 5×, or 10× larger than the second length scale. For example, in the exemplary drawing of FIG. 2, the first length scale 21 is about 4× larger than the second length scale 22, noting that the schematic drawing of FIG. 2 is not necessarily to scale. Preferably, the first length scale is at least one order of magnitude larger than the second length scale. In some embodiments, the first length scale is at least two orders of magnitude larger than the second length scale (equivalently, the second length scale is at least two orders of magnitude smaller than the first length scale).

The first length scale may be from about 1 micron to about 100 microns, for example, such as about 1, 2, 5, 10, 20, 30, 40, 50, 60, 70, 80, 90, or 100 microns. The first length scale is an average over the metal-alloy biphasic system. The first length scale may have a narrow or wide size distribution.

The second length scale may be from about 0.01 microns to about 1 micron, for example, such as about 0.01, 0.02, 0.05, 0.1, 0.2, 0.3, 0.4, 0.5, 0.6, 0.7, 0.8, or 0.9 microns. The second length scale is an average over the metal-alloy biphasic system. The second length scale may have a narrow or wide size distribution.

In preferred embodiments, at least one of the first metal phase or the second metal phase forms a continuous network within the hierarchical microstructure. A "continuous network" of a phase means that the phase contains one or more regions having a plurality of particles of the given phase, wherein the regions collectively have a characteristic average length scale that is at least 10 times the average diameter of the particles of the phase. In some embodiments, the characteristic average length scale is at least 25, 50, 100, 200, 500, or 1000 times the average diameter of the particles of the phase. When single particles of a phase are present in isolation, those particles count against the characteristic average length scale. Note that the characteristic average length scale is typically based on a tortuous length defined by a given region, although in principle a region could be linear. In certain embodiments, all of the particles of a given phase are contained in a single, continuously connected region, i.e. there is a single region defining a continuous network of a given phase in the metal-alloy biphasic system.

In some embodiments, the higher-melting-point first metal phase forms a continuous network within the hierarchical microstructure. In some embodiments, the second metal phase also forms a second continuous network within the metal-alloy biphasic system. In certain embodiments, the first metal phase forms a first continuous network within the hierarchical microstructure, and the second metal phase forms a second continuous network within the hierarchical microstructure. When both the first metal phase and second metal phase form continuous networks, the structure may be referred to as a "continuous biphasic structure."

Some variations of the invention provide a metal-alloy biphasic system containing at least a first metal phase and a second metal phase,
wherein the first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
wherein the second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;
wherein the first metal phase is characterized by a first melting temperature, and wherein the second metal phase is characterized by a second melting temperature that is lower than the first melting temperature; and
wherein the first metal phase forms a first continuous network within the metal-alloy biphasic system.

In some embodiments, the first continuous network is uniformly distributed within the metal-alloy biphasic system. When there is a second continuous network present, it may also be uniformly distributed within the metal-alloy biphasic system. A uniform distribution of a continuous metal-phase network means that the metal phase is randomly dispersed throughout the metal-alloy biphasic system, and the local concentration of the applicable metal phase within any selected region is statistically the same as any other arbitrary region of the metal-alloy biphasic system.

The metal-alloy biphasic system may be an additively manufactured structure with a scalloped build pattern. Alternatively, or additionally, the metal-alloy biphasic system may be a melt-solidified structure. Alternatively, the metal-alloy biphasic system may be an arc-welded structure. Methods of using the metal-alloy biphasic system are further discussed later in this specification.

FIGS. 1 to 4 demonstrate a niobium-copper (Nb—Cu) system with multiple length scales spanning at least one order of magnitude.

In FIG. 1, the additive-manufacturing parameter space is identified so that scan strategies may be developed specifically to control solidification and primary dendrite arm spacing across two orders of magnitude. Additionally, secondary arm spacing (see FIG. 2) may add another length scale in microstructure hierarchy. Due to the immiscibility of the metal phases in the system, these features are locked in rather than homogenized into a typical grain structure. In FIG. 1, "DS" is direction solidification and "DC Casting" is direct-chill casting. The y-axis is additive-manufacturing isotherm velocity (m/s), and the x-axis is additive-manufacturing temperature gradient (K/m). Note that the scale bar shading, from the top (1 cm) to the bottom (1 μm), is in the direction of decreasing primary dendrite arm spacing which is from left to right in the graph, as indicated with an arrow.

FIG. 2 depicts a typical additive-manufacturing process to fabricate a metal-alloy biphasic system in this disclosure. Within a powder bed, a starting feedstock is melted (or at least one metal phase is melted) with a laser, to generate a melt pool. Solidification is controlled by adjusting temperature gradient G and isotherm velocity V, such as with reference to FIG. 1 for the system of interest, or via experimentation. A metal-alloy biphasic system is fabricated as shown on FIG. 2, where the metal-alloy biphasic system has a first metal phase of a refractory first metal (high melting point) and a second metal phase of a second metal that is immiscible in the first metal but may be etchable. The metal-alloy biphasic system has a hierarchical microstructure, with $\lambda_1$=first hierarchical length scale of structure and $\lambda_2$=second hierarchical length scale of structure. The ranges indicated in FIG. 2 are $\lambda_1$=1-100 μm and $\lambda_2$=0.01-1 μm, which are exemplary of some embodiments.

Figure 3:
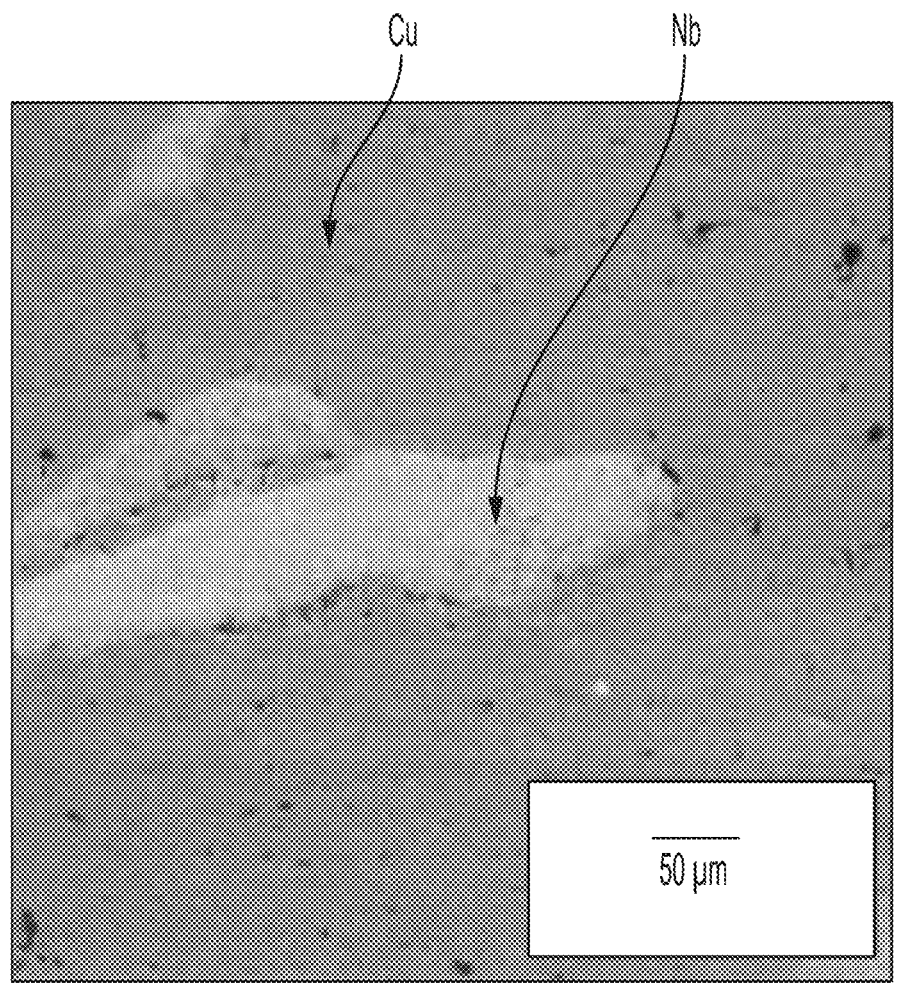
FIG. 3 is a SEM image (scale bar=50 microns) of an exemplary biphasic metal alloy system with a first metal phase of Nb and a second metal phase of Cu, showing large arterial spacing, in certain embodiments.

FIG. 3 shows a scanning electron microscope (SEM) image (scale bar=50 microns) of an exemplary biphasic metal alloy system with a first metal phase of Nb and a second metal phase of Cu. In this biphasic metal alloy system, the concentration of Nb is about 10 wt % and the concentration of Cu is about 90 wt %. FIG. 3 reveals large arterial spacing between regions of the Nb phase. The Nb and Cu phases are both continuously connected with length scales of at least 100 microns. Also, the metal-alloy biphasic system of FIG. 3 is characterized by a hierarchical microstructure containing a first length scale and a second length scale that is at least one order of magnitude smaller than said first length scale. In particular, a first length scale of about 100 microns is defined by the distance between Nb arterial regions (refer to $\lambda_1$ in FIG. 2). A second length scale of about 1-5 microns is defined by the surface features at the edge of the large Nb arterial region (refer to $\lambda_2$ in FIG. 2).

Figure 4:
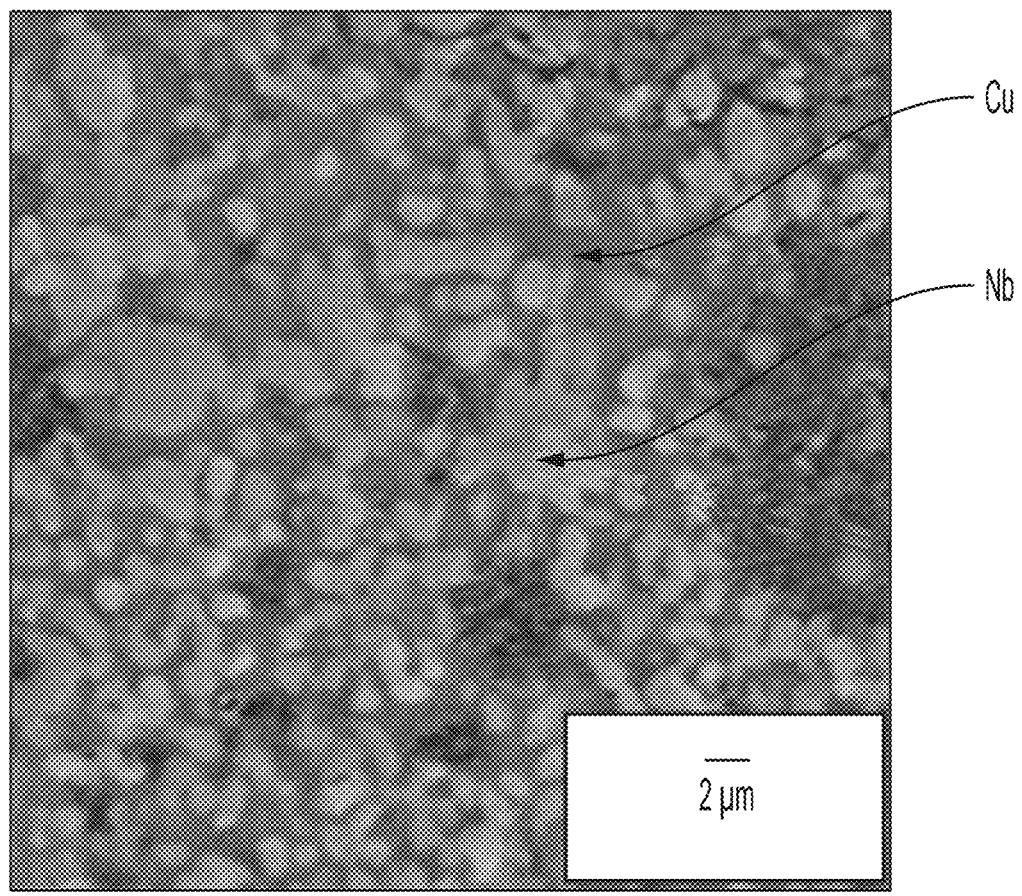
FIG. 4 is a SEM image (scale bar=2 microns) of an exemplary biphasic metal alloy system with a first metal phase of Nb and a second metal phase of Cu, showing refined transpiration spacing, in certain embodiments.

FIG. 4 shows a SEM image (scale bar=2 microns) of an exemplary biphasic metal alloy system with a first metal phase of Nb and a second metal phase of Cu. In this biphasic metal alloy system, the concentration of Nb is about 10 wt % and the concentration of Cu is about 90 wt %. FIG. 4 reveals refined transpiration spacing between regions of the Nb phase. The Cu phase is continuously connected with a length scale of at least about 10 microns. The Nb phase is continuously connected on a smaller length scale than the length scale of Cu phase connectivity.

As a stand-alone component, a metal-alloy biphasic system may have superior properties compared to the individual components of the system. For instance, enhanced high-temperature stability and strength may be provided by multiple dislocation-blocking interfaces, leading to reduced phase interdiffusion and creep. The hierarchical architecture of the metal-alloy biphasic system provides enhanced functionality and customization to meet multiple objectives across a single macroscale geometry.

Additionally, by controlling the metal-phase length scales, Hall-Petch-type strengthening (grain-boundary strengthening) may be induced to improve mechanical properties.

Alternately, or additionally, metal-alloy biphasic systems may provide complex dynamic and inertial dampening. Such benefits may arise due to the variations in elastic stiffness between the phases or, in some cases, due to differences in the melting points. For example, a self-contained immiscible material may melt at the operating temperature, providing a solid-liquid component.

The metal-alloy biphasic system may be used as a scaffold in which one of the constituent phases is etched or melted out, leaving behind a porous network which is optionally infiltrated with another material. The other material may be one that does not meet an immiscibility criterion for processing but may provide enhanced performance over the initial biphasic system (prior to etching or melting a sacrificial phase). In some embodiments, the metal-alloy biphasic system may act as a scaffold for transpiration cooling or other pressure-driven or capillary-driven flow applications. For example, for hypersonic leading edges, a high-temperature biphasic structure (e.g. Nb—Cu) may have the low-temperature phase removed and replaced with a targeted transpiration media for enhanced cooling.

In some embodiments, an initial metal-alloy biphasic system is provided, with a first metal phase and a second metal phase, as described earlier. At least a portion of one of the metal phases may be removed using various means, such as melting out the second metal phase, chemically and/or physically etching the first or second metal phase, or another removal technique. The result is at least some empty space where the removed metal phase had previously been. The empty space may then be infiltrated with something else.

Therefore some variations of the invention provide a metal-containing scaffold system comprising a metal-containing first phase and a second phase, wherein the metal-containing first phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

wherein the second phase contains porous empty space or a material selected from the group consisting of a second metal, a metal oxide, a non-metal oxide, water, a non-aqueous liquid, a polymer, a gas, and combinations thereof; and wherein the metal-containing scaffold system is characterized by a hierarchical microstructure containing a first length scale and a second length scale that is at least one order of magnitude smaller than the first length scale.

When the material in the second phase includes a second metal, the second metal may be a metal other than W, Nb, V, Ta, Mo, Cr, Al, Ce, Bi, Zr, Hf, Ti, Mn, Fe, Co, Ni, Cu, Ag, Au, Zn, Sn, or Pb—that is, the second metal may be a metal that is not necessarily immiscible with the first metal. Exemplary second metals include, but are not limited to, Li, Na, K, Rb, Cs, Be, Mg, Ca, Sr, Ba, Sc, Y, Cr, Mo, Tc, Re, Ru, Os, Rh, Ir, Pd, Pt, Ag, Au, Cd, Hg, Ga, In, Tl, Ge, and Sb.

Exemplary metal oxides in the second phase include, but are not limited to, oxides of W, Nb, V, Ta, Mo, Cr, Al, Ce, Bi, Zr, Hf, Ti, Mn, Fe, Co, Ni, Cu, Ag, Au, Zn, Sn, Pb, Li, Na, K, Rb, Cs, Be, Mg, Ca, Sr, Ba, Sc, Y, Cr, Mo, Tc, Re, Ru, Os, Rh, Ir, Pd, Pt, Ag, Au, Cd, Hg, Ga, In, Tl, Ge, Sn, Pb, and Sb.

An exemplary non-metal oxide is $SiO_2$, without limitation. Non-metal elements may also be contained in the second phase, such as (but not limited to) B, C, Si, P, and S.

Exemplary non-aqueous liquids include, but are not limited to, alcohols, diols, ethers, alkanes, and alkenes. Aqueous liquids, containing at least water, may form the second phase.

Exemplary polymers include, but are not limited to, natural waxes, synthetic waxes, starch, cellulose, polyethylene, polypropylene, polyethylene terephthalate, and polylactide.

Exemplary gases in the second phase include, but are not limited to, air, $N_2$, Ar, $CO_2$, CO, $CH_4$, steam. Gases may be present at various pressures, such as 10-6 GPa to 100 GPa.

Feedstocks and Methods to Make Metal-Alloy Biphasic Systems

Some variations of the invention are predicated on feedstock materials designed to be convertible into bulk biphasic materials for use in a variety of applications.

To fabricate an above-described metal-alloy biphasic system, a starting feedstock is first provided. In the context of this disclosure, "feedstock" generally (unless otherwise specified) includes any powder, wire, ribbon, or other geometry which in some variations may be used for additive manufacturing, depending on the manufacturing equipment employed or customized. When the metal-alloy biphasic system is produced via a method other than additive manufacturing, feedstock geometries may include powder, pellet, cylinder, or other ingot or arbitrary shape. Combinations are possible. For example, a powder feedstock may be processed by additive manufacturing to fabricate an object that itself may be a feedstock.

In a typical embodiment, the starting feedstock is a powder. For example, the feedstock may include a mixture of a powder of a first metal and a powder of a second metal, in intimate physical contact. "Intimate physical contact" means that the two powders are physically blended (mixed) together, to form the feedstock powder. In some embodiments, there are chemical bonds between particles of the first metal and second metal. Chemical bonding results in intimate physical contact between the powder particles.

A feedstock powder may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. Particles may be solid, hollow, or a combination thereof. Particles can be made by any means including, for example, gas atomization, milling, cryomilling, wire explosion, laser ablation, electrical-discharge machining, or other techniques known in the art.

Some variations of the invention provide a metal-alloy biphasic powder containing at least a first metal material and a second metal material,
  wherein the metal-alloy biphasic powder has an average particle size selected from about 10 nanometers to about 1 millimeter, or another size range as further disclosed below;
  wherein the first metal material consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
  wherein the second metal material consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein $M^2$ is different than $M^1$;
  wherein the first metal material is characterized by a first melting temperature, and the second metal material is characterized by a second melting temperature that is lower than the first melting temperature; and
  wherein the solubility of the first metal material in the second metal material is less than 5% at the second melting temperature.

The solubility of the first metal material in the second metal material is on the basis of atom percent. In some embodiments, the solubility of the first metal material in the second metal material is less than 4%, 3%, 2%, 1%, 0.5%, 0.4%, 0.3%, 0.2%, 0.1%, 0.05%, 0.04%, 0.03%, 0.02%, or 0.01% at the second melting temperature. In certain embodiments, the solubility of the first metal material in the second metal material is essentially 0, i.e., the first material is insoluble in the second material. In some embodiments, the first metal material is selected for its solubility in the second metal material at certain temperature, such as, but not limited to, the second melting temperature or another phase transition in the system, or over a temperature range, such as from the second melting temperature to the liquidus temperature for a given composition.

In some embodiments, the solubility of the second metal material in the first metal material is less than 5% at the second melting temperature. In some embodiments, the solubility of the second metal material in the first metal material is less than 4%, 3%, 2%, 1%, 0.5%, 0.4%, 0.3%, 0.2%, 0.1%, 0.05%, 0.04%, 0.03%, 0.02%, or 0.01% at the second melting temperature. In certain embodiments, the solubility of the second metal material in the first metal material is essentially 0, i.e., the second material is insoluble in the first material. In some embodiments, the second metal material is selected for its solubility in the first metal material at certain temperature, such as the second melting temperature or another phase transition in the system, or over a temperature range, such as from the second melting temperature to the liquidus temperature for a given composition.

The first metal material and second metal material are "immiscible" when the solubility of the first metal material in the second metal material is essentially 0, and the solubility of the first metal material in the first metal material is also essentially 0—i.e., mutual insolubility. In some embodiments, the first metal material and second metal material are selected to be immiscible at a certain temperature, such as, but not limited to, the second melting temperature or another phase transition in the system, or over a temperature range, such as from the second melting temperature to the liquidus temperature for a given composition.

The first metal material may be a first metal or a first metal alloy. The second metal material may be a second metal or a second metal alloy. In some embodiments, the first metal material is a first metal alloy and the second metal material is a second metal alloy that is immiscible in the first metal alloy.

In some embodiments, M is selected from the group consisting of Group 5 elements and Group 6 elements, and $M^2$ is selected from Group 11 elements. Group 5 elements include V, Nb, Ta; Group 6 elements include Cr, Mo, and W; and Group 11 elements include Cu, Ag, and Au.

In certain embodiments, the metal-alloy biphasic powder contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof.

Figure 5:
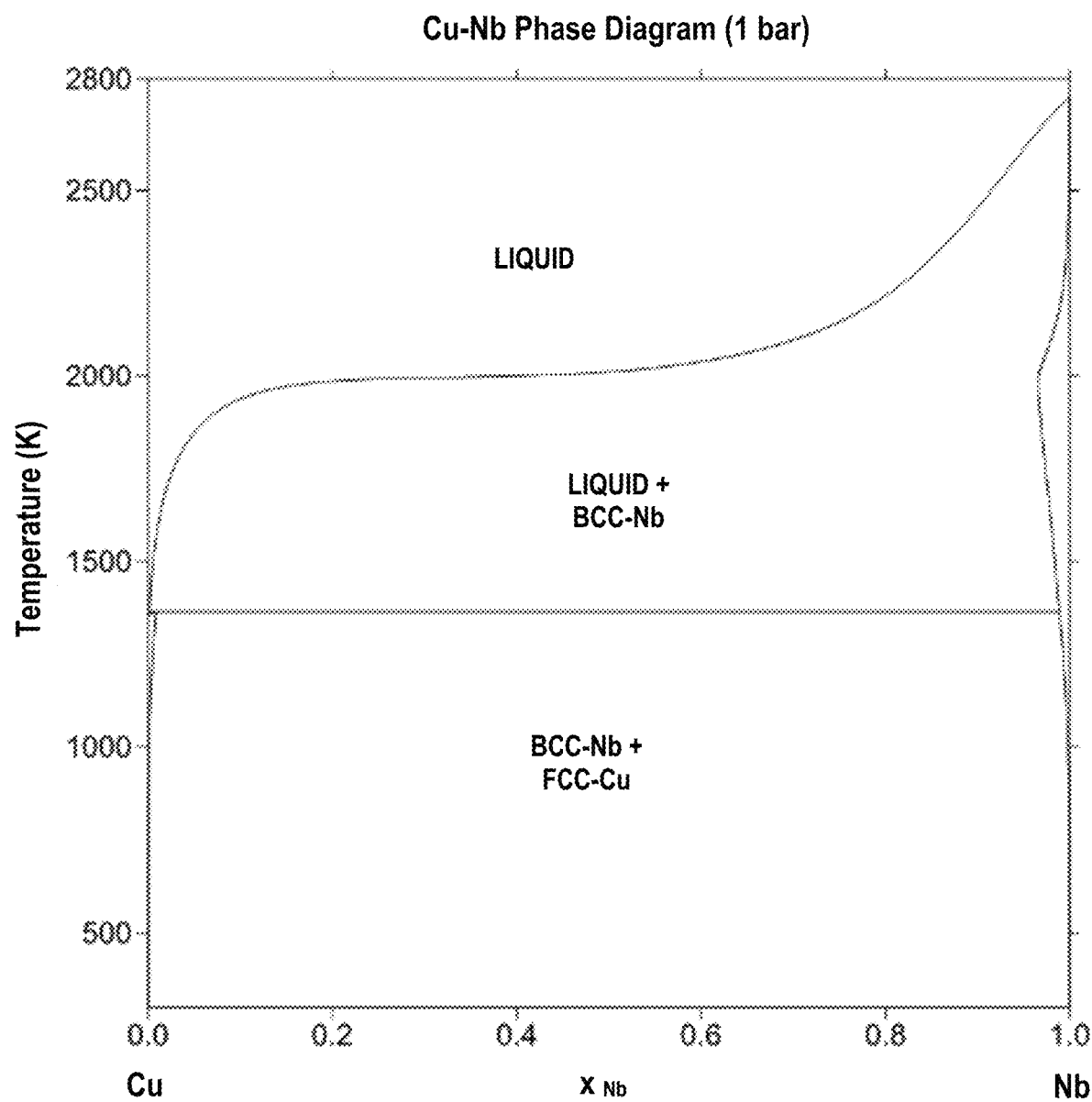
FIG. 5 is a phase diagram of Nb—Cu in some embodiments, where $x_{Nb}$ is the atom fraction of Nb, BCC is the body-centered cubic solid phase of Nb, and FCC is the face-centered cubic solid phase of Cu.

FIG. 5 is a phase diagram of Nb—Cu in some embodiments, where $x_{Nb}$ is the atom fraction of Nb, BCC is the body-centered cubic solid phase of Nb, and FCC is the face-centered cubic solid phase of Cu. In this system ($M^1$=Nb and $M^2$=Cu), the first melting temperature is about 2477°C and the second melting temperature is about 1085° C. There is very little solubility of Nb in Cu, and of Cu in Nb, at the second melting temperature of 1085° C. At or below 1085° C., Nb forms a BCC solid phase and Cu forms an immiscible FCC solid phase. At higher temperatures but below the liquidus line, Nb remains as a solid BCC phase, insoluble in the liquid phase.

The composition range for the metal-alloy biphasic powder may vary widely. In FIG. 5, for example, the range of Nb content for the metal-alloy biphasic powder may vary widely, such that a powder composition is selected between the two single-phase fields. A higher-order alloy may be used, in which at least a third component (and potentially more components) are present along with the binary components (e.g., Nb and Cu), as long as at least one phase remains insoluble in another phase. In the case of the Nb—Cu system, for example, a niobium alloy such as C-103 may be employed. Alloy C-103 contains about 89 atom % Nb, about 10 atom % Hf, and about 1 atom % Ti. The non-Nb elements Hf and Ti may have some solubility in Cu, including greater than 5% solubility, but Nb has less than 5% solubility in Cu. In this situation, the overall alloy contains at least Cu, Nb, Hf, and Ti, with at least the Cu and Nb being immiscible.

The first metal material may be present in the metal-alloy biphasic powder in a concentration from about 1 wt % to about 99 wt %, such as about 2, 5, 10, 20, 30, 40, 50, 60, 70, 80, 90, or 95 wt %. Independently, the second metal material may be present in the metal-alloy biphasic powder in a concentration from about 1 wt % to about 99 wt %, such as about 2, 5, 10, 20, 30, 40, 50, 60, 70, 80, 90, or 95 wt %. The desired concentration of a metal material may be dictated by its density; less weight of a high-density metal material may be used, for example, to reach a similar volumetric effect. The sum of concentrations of first metal material and second metal material may be from about 2 wt % to 100 wt %, such as about 5, 10, 15, 20, 25, 30, 40, 50, 60, 70, 80, 90, 95, 99, or 100 wt %. Other components may be other alloying elements, functional additives, inert additives, impurities, etc.

The weight ratio of the first metal material to the second metal material may be selected from about 0.01 to about 100, such as from about 0.05 to about 20, for example. A typical weight ratio of the first metal material to the second metal material is 1.0, i.e. 50/50 by weight when no other components are present. In various embodiments, the weight ratio of the first metal material to the second metal material is about 0.1, 0.2, 0.5, 1, 2, 3, 4, 5, 6, 7, 8, 9, 10, 15, 25, 35, 50, 65, or 75.

Some variations provide a method of producing a metal-alloy biphasic powder, said method comprising:
(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein said first powder has an average particle size selected from about 10 nanometers to about 1 millimeter;
(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal, and wherein said second powder has an average particle size selected from about 10 nanometers to about 1 millimeter;
(c) processing said first powder and said second powder using a technique selected from the group consisting of high-energy milling, gas atomization, liquid atomization, plasma atomization, plasma spheroidization, and combinations thereof; and
(d) obtaining a metal-alloy biphasic powder containing at least $M^1$ and $M^2$,
wherein $M^1$ is characterized by a first melting temperature, and $M^2$ is characterized by a second melting temperature that is lower than the first melting temperature; and
wherein the solubility of $M^1$ in $M^2$ is less than 5% at the second melting temperature.

In step (c), high-energy milling may be high-energy ball milling using refractory spheres to form powders. Gas atomization may utilize air, nitrogen, argon, or helium at high velocity to disrupt a stream of liquid metal and form droplets and then powders. Liquid atomization may be water atomization which utilizes water at high pressure to disrupt a stream of liquid metal and form droplets and then powders. Plasma atomization may be mixed-wire plasma atomization. Plasma spherodization may be blended-powder plasma spherodization. In some embodiments, the liquidus temperature is reasonably low to allow for convenient atomization. When the liquidus temperature is relatively high, plasma atomization of wires (e.g. braided elemental wires) may be used to produce powder.

In some embodiments, the first metal is provided in 0.01-50 micron powder form, blended with 10-500 micron powder of the second metal. In some embodiments, the average powder particle size for the first metal is from about 0.5 microns to about 10 microns. In some embodiments, the average powder particle size for the second metal is from about 25 microns to about 100 microns.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

The selected size of the starting powders may be inversely correlated to the melting points, to enable faster dissolution of higher-melting-point phases into the liquid state. That is, by using smaller powder sizes when the melting point is higher, surface area is increased for enhanced dissolution. Smaller particles may help overcome mass-transport and/or heat-transport limitations that may prevent equilibrium from readily being reached.

The powder particles may have a narrow or wide particle-size distribution, although a narrow size distribution is usually preferred. The particle-size distribution may be characterized by a particle-size dispersity index, which is the ratio of particle-size standard deviation to average particle size (also known as the coefficient of variance). In various embodiments, the powder particle-size dispersity index is about 0.05, 0.1, 0.2, 0.3, 0.4, 0.5, 0.6, 0.7, 0.8, 0.9, or 1.0.

The particle-size distribution of the powder may also be characterized by reference to D10, D50, and D90, for example. D10 is the diameter where ten percent of the distribution has a smaller particle size and ninety percent has a larger particle size. D50 is the diameter where fifty percent of the distribution has a smaller particle size and fifty percent has a larger particle size. D90 is the diameter where ninety percent of the distribution has a smaller particle size and ten percent has a larger particle size. An exemplary powder for additive manufacturing via selective laser melting has D10=20 microns and D90=60 microns. In various embodiments, D10 is about 1, 5, 10, 20, 30, 40, or 50 microns while D90 is about 5, 10, 20, 30, 40, 50, 60, 70, 80, 90, or 100 microns.

The powder preferably contains particles that are nominally spherical. By "nominally spherical" it is meant that the particles, on average, have a sphericity of at least 0.9, preferably at least 0.95, and more preferably at least 0.99. Sphericity is the measure of how closely the shape of an object approaches that of a perfect sphere. The sphericity of a particle is the ratio of the surface area of a reference sphere, having the same volume as the given particle, to the surface area of the particle. The sphericity of an ideal sphere is exactly 1. As a negative example, the sphericity of a perfect cube is about 0.8, which means a cubic particle is not nominally spherical as defined herein.

Some embodiments of the present invention utilize materials, methods, and principles described in commonly owned U.S. patent application Ser. No. 15/209,903, filed Jul. 14, 2016, commonly owned U.S. patent application Ser. No. 15/808,877, filed Nov. 9, 2017, and/or commonly owned U.S. patent application Ser. No. 16/565,570, filed Sep. 10, 2019, each of which is hereby incorporated by reference herein. For example, certain embodiments utilize functionalized powder feedstocks as described in U.S. patent application Ser. No. 15/209,903. The present disclosure is not limited to those functionalized powders.

In some embodiments, powder particles of the first metal coat base powders of the second metal in the form of a continuous coating or an intermittent (discontinuous) coating, either of which may be referred to as a "surface-functionalized" base powder. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

The starting feedstock (whether powder or otherwise) may or may not be surface-functionalized, which means that particles of the first metal are disposed on particles of the second metal. In some embodiments, the surface-functionalized powder is nanofunctionalized, i.e. nanometer-sized particles of the first metal are disposed on surfaces of particles of the second metal. As stated above, the first metal is not necessarily a powder with particles smaller than 1 micron, but rather may be as high as 50 microns or more. In a surface-functionalized powder, preferably the average particle size of the first metal is smaller than the average particle size of the second metal, such as 2×, 5×, or 10× smaller, for example.

Also, some embodiments employ a surface-functionalized powder of a second metal that is functionalized with a metal or other element different than the first metal. The metal or other element may form an immiscible phase with one of the first or second metals, or may form a miscible alloy with one of the first or second metals. Likewise, some embodiments employ a surface-functionalized powder of a first metal that is functionalized with a metal or other element different than the second metal. Again, the metal or other element may form an immiscible phase with one of the first or second metals, or may form a miscible alloy with one of the first or second metals.

A surface-functionalized powder may be functionalized with one or more of W, Nb, V, Ta, Mo, Cr, Al, Ce, Bi, Zr, Hf, Ti, Mn, Fe, Co, Ni, Cu, Ag, Au, Zn, Sn, Pb, Li, Na, K, Rb, Cs, Be, Mg, Ca, Sr, Ba, Sc, Y, Cr, Mo, Tc, Re, Ru, Os, Rh, Ir, Pd, Pt, Ag, Au, Cd, Hg, Ga, In, Tl, Ge, Sn, Pb, Sb, and alloys, hydrides, carbides, nitrides, oxides, or sulfides thereof, and combinations of any of the foregoing.

In certain embodiments, the second metal $M_2$ is surface-functionalized or nanofunctionalized with $M_1$ in the starting powder, and the final metal-alloy biphasic system is a $M_1$-$M_2$ system (e.g. Nb—Cu).

Techniques for producing surface-functionalized powder materials (when employed herein) are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein.

In some embodiments, the feedstock powder is provided such that the first metal and the second metal initially are physically separated, such as in different containers, for storage or transport. At the time and place of use as a feedstock for making a metal-alloy biphasic material (e.g., at a site of additive manufacturing), the individual powders may then be blended together so that the first and second metals are in intimate physical contact with each other. The first and second metals are mixed or blended at respective amounts in order to result in the target final composition. This is the typical, preferred embodiment that enables a uniform dispersion throughout the additively manufactured product. However, in certain situations in which a non-uniform dispersion is desired, it may be beneficial for the feedstock powder to contain regions of lower or higher concentrations of one metal, such as to produce a gradient of composition in the final component.

Hydrides, carbides, oxides, nitrides, borides, or sulfides of a first metal or second metal may be desirable, compared to the pure form, for various reasons including stability, cost, or other factors. For example, in certain embodiments, hydrogen-stabilized zirconium particles ($ZrH_2$) are preferred over pure Zr particles due to $ZrH_2$ stability in air and ability to decompose at the melting temperature, resulting in formation of a favorable $Al_3Zr$ intermetallic phase. The hydrogen evolves from the system and does not interfere with the alloying chemistry.

It is known that some light elements, such as Zn and Mg, evaporate relatively rapidly during additive manufacturing and therefore the feedstock powder composition may be adjusted to contain an excess of these light element(s) so that the correct final composition, for the intended aluminum alloy, is achieved after additive manufacturing. This specification hereby incorporates by reference commonly owned U.S. patent application Ser. No. 15/996,438, filed on Jun. 2, 2018, which teaches how to enrich feedstock powders for additive manufacturing with certain light elements in order to achieve a desired final concentration of the additively manufactured component.

In certain embodiments, the feedstock powder is first converted into another form of feedstock, such as a wire, which may be formed itself via additive manufacturing, extrusion, wire drawing, or other metal-processing techniques. The feedstock object (e.g., wire) may then be subjected to additive manufacturing or another processing technique.

Generally speaking, the starting feedstock may be made from, or employed in, additive manufacturing, welding, pressing, sintering, mixing, dispersing, friction stir welding, extrusion, binding (such as with a polymer binder), melting, semi-solid melting, casting, or a combination thereof. Melting may include induction melting, resistive melting, skull melting, arc melting, laser melting, electron beam melting, semi-solid melting, or other types of melting (including conventional and non-conventional melt processing techniques). Casting may include centrifugal, pour, or gravity casting, for example. Sintering may include spark discharge, capacitive-discharge, resistive, or furnace sintering, for example. Mixing may include convection, diffusion, shear mixing, or ultrasonic mixing, for example.

The feedstock powder may be utilized specifically in a powder-based (or other feedstock form) additive manufacturing process, including, but not limited to, selective laser melting (SLM), electron beam melting (EBM), and/or laser engineered net shaping (LENS).

Selective laser melting is an additive manufacturing technique designed to use a high power-density laser to melt and fuse metallic powders together. Selective laser melting has the ability to fully melt the metal material into a solid 3D part.

Electron-beam melting is a type of additive manufacturing for metal parts. Metal powder is welded together, layer by layer, under vacuum using an electron beam as the heat source.

Laser engineered net shaping is an additive manufacturing technique developed for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication as well.

It has been recognized that biphasic metal alloys with decreased melting points can enable such metal alloys to be used as atomizable feedstocks in additive manufacturing and/or as sinterable feedstocks in conventional powder processing.

In some embodiments, additive manufacturing via selective laser melting, electron beam melting, or laser engineered net shaping can process feedstock powders into metal-alloy biphasic system parts with uniform distribution (good dispersion) of phase regions of the first metal, to provide strength and ductility. During local heating to high temperatures, but below the melting point of the first metal, the first metal is dissolved and/or suspended in the melt pool. A high energy input leads to preferred turbulent mixing of the melt pool, ensuring a uniform composition within the melt pool. Rapid cooling of the melt pool leads to uniform phase and mitigates agglomeration and coarsening of the precipitated phase regions.

In some embodiments employing elevated temperature processing-such as the high-temperature melt pool in additive manufacturing—the immiscible materials form a solution in the liquid state. As the liquid cools, a nucleation event of the higher-temperature phase occurs and begins propagating and growing into the solutionized liquid, causing the high-temperature-phase solute atoms to be depleted from the liquid during propagation of the growth front. Under high thermal gradients, dendritic growth is favorable, leaving a solute-depleted liquid in between the higher-temperature dendrite phases, thereby preventing coarsening. Due to the immiscibility of the system, these features are locked in rather than homogenized into a grain structure. At high solidification velocities, solute trapping (a kinetic phenomenon) may occur but will not fundamentally change the system immiscibility which is dictated by thermodynamics. Systems in which there is significant segregation between the liquid and solid phases (e.g., Al—Bi) may be preferred in order to prevent back diffusion into the interdendritic liquid. In some cases, post-processing heat treatment may be carried out to diffuse any trapped solute to the phase boundaries.

During additive manufacturing, the power, spot size, speed, hatch spacing, and other parameters may be controlled and manipulated during the production of an additive-manufacturing build structure. This optimization results in explicit local changes in the thermal gradients and solidification velocities. These changes in solidification conditions have direct thermodynamic and kinetic impacts on the characteristic length scales of primary and secondary dendrite arm spacing (see FIGS. 1 and 2). By manipulating the local solidification conditions, a range of material structures can be produced.

When additive manufacturing is employed to make the metal-alloy biphasic system, the observable microstructure typically will be physically tied to the process of making the biphasic system. For example, the additively manufactured metal-alloy biphasic system may have a scalloped build pattern, which has variation in phase boundaries in the build direction. In some embodiments, an additively manufactured microstructure has a crystallographic texture that is not solely oriented in an additive-manufacturing build direction. For example, the additively manufactured microstructure may contain a plurality of dendrite layers having differing primary growth-direction angles with respect to each other.

Welding, directional solidification, conventional casting, and direct-chill casting are all well-known techniques. Welding is a fabrication process that joins metal materials by using high heat to melt the parts together and allowing them to cool, causing fusion. Directional solidification is solidification that occurs from the farthest end of the casting and works its way towards the entry passage. Progressive solidification, also known as parallel solidification, is solidification that starts at the walls of the casting and progresses perpendicularly from that surface. Conventional casting is a process in which a liquid metal is delivered into a mold that contains a hollow shape (i.e., a 3D negative image) of the intended shape. Direct-chill casting is a method for the fabrication of cylindrical or rectangular solid ingots from metals, by pouring liquid metal continuously into a short mold that is open at the bottom. An outer layer of metal solidifies within a cooled mold. After leaving the closed mold at its bottom, liquid (e.g., water) is directly sprayed on the new ingot, continuing the solidification until complete.

Regardless of the method, in some embodiments, the first metal does not melting during processing, but the second metal does melt. In other embodiments, both the first metal and second metal melt during processing.

Some variations provide a method of producing a metal-alloy biphasic system, said method comprising:

(a) providing a first powder containing a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;

(b) providing a second powder containing a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;

(c) processing said first powder and said second powder (optionally, as a pre-processed powder) using a technique selected from the group consisting of additive manufacturing, directional solidification, direct-chill casting, conventional casting, welding, sintering, and combinations thereof; and (d) obtaining a metal-alloy biphasic system containing at least a first metal phase and a second metal phase, wherein the first metal phase consists of M¹, and
wherein the second metal phase consists of M²,
wherein the first metal phase is characterized by a first melting temperature, and wherein the second metal phase is characterized by a second melting temperature that is lower than the first melting temperature; and
wherein the metal-alloy biphasic system is characterized by a hierarchical microstructure containing a first length scale and a second length scale that is at least one order of magnitude smaller than the first length scale.

Some variations provide a method of producing a metal-alloy biphasic system, the method comprising:
(a) providing a first powder containing a first metal M¹ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
(b) providing a second powder containing a second metal M² selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;
(c) processing the first powder and the second powder (optionally, as a pre-processed powder) using a technique selected from the group consisting of additive manufacturing, directional solidification, direct-chill casting, conventional casting, welding, sintering, and combinations thereof; and
(d) obtaining a metal-alloy biphasic system containing at least a first metal phase and a second metal phase, wherein the first metal phase consists of M¹, and wherein the second metal phase consists of M²,
wherein the first metal phase is characterized by a first melting temperature, and wherein the second metal phase is characterized by a second melting temperature that is lower than the first melting temperature; and
wherein the first metal phase forms a first continuous network within the metal-alloy biphasic system.

Some variations provide a method of producing a metal-containing scaffold system comprising a metal-containing first phase and a second phase, the method comprising:
(a) providing a first powder containing a first metal M¹ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
(b) providing a second powder containing a second metal M² selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein the second metal is different than the first metal;
(c) processing the first powder and the second powder (optionally, as a pre-processed powder) using a technique selected from the group consisting of additive manufacturing, directional solidification, direct-chill casting, conventional casting, welding, sintering, and combinations thereof;
(d) obtaining a metal-alloy biphasic system containing at least a first metal phase and a second metal phase, wherein the first metal phase consists of M¹, and wherein the second metal phase consists of M²; and
(e) replacing at least a portion of one of the first metal phase or the second metal phase with porous empty space or a material selected from the group consisting of a second metal, a metal oxide, a non-metal oxide, water, a non-aqueous liquid, a polymer, a gas, and combinations thereof,
wherein the metal-containing scaffold system is characterized by a hierarchical microstructure containing a first length scale and a second length scale that is at least one order of magnitude smaller than the first length scale.

In any of the methods described above, as noted, the first powder and the second powder may optionally be pre-processed to first generate a pre-processed powder. For example, the first powder and second powder may be pre-processed using a technique selected from the group consisting of high-energy milling, gas atomization, plasma atomization, plasma spherodization, and combinations thereof. The pre-processed powder may then be processed using a technique selected from the group consisting of additive manufacturing, directional solidification, direct-chill casting, conventional casting, welding, sintering, and combinations thereof, for example.

In some embodiments, rapid solidification from atomized powders provides highly refined microstructures as a starting point for bulk material production. A bulk material may be another powder or a structure, for example.

In some embodiments, solute trapping leads to a uniform composition in the powder, which may be annealed or heat-treated to produce different biphasic architectures by driving segregation. Biphasic architectures may themselves be used a structure or object, may be fed to another process for conversion, or may be milled back into a powder, if desired.

Following processing such as additive manufacturing, welding, melt solidification, or another method, a solid structure is eventually obtained. The solid structure may be a metal-alloy biphasic system object in any geometric or physical form. The object may be an ingot, a billet, a feed object, a structurally engineered object, a part of arbitrary geometry (in the case of additive manufacturing), a coating, or another type of structure.

In some embodiments, the metal-alloy biphasic system has a microstructure that is "substantially crack-free" which means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect. Typically, a crack contains open space, which may be vacuum or may contain a gas such as air, $CO_2$, $N_2$, and/or Ar. A crack may also contain solid material different from the primary material phase of the aluminum alloy.

The metal-alloy biphasic system microstructure may be substantially free of porous defects, in addition to being substantially crack-free. "Substantially free of porous defects" means at least 99 vol % of the metal alloy contains no porous voids having an effective diameter of at least 1 micron. Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, optionally to arrive at a final additively manufactured metal part that is substantially free of porous defects in addition to being substantially crack-free.

The metal-alloy biphasic system may have porosity from 0% to about 50%, for example, such as about 5%, 10%, 20%, 30%, 40%, or 50%, in various embodiments. The porosity may derive from space both within particles (e.g., hollow shapes) as well as space outside and between particles. The total porosity accounts for both sources of porosity.

In some embodiments, the metal-alloy biphasic system microstructure has "equiaxed grains" which means that at least 90 vol %, preferably at least 95 vol %, and more preferably at least 99 vol % of the metal alloy contains grains that are roughly equal in length, width, and height. In preferred embodiments, at least 99 vol % of the metal alloy contains grains that are characterized in that there is less than 25%, preferably less than 10%, and more preferably less than 5% standard deviation in each of average grain length, average grain width, and average grain height. In the metal-alloy biphasic system, crystals of metal alloy may form grains in the solid. Each grain is a distinct crystal with its own orientation. The areas between grains are known as grain boundaries. Within each grain, the individual atoms form a crystalline lattice.

Additional heat treatments, such as aging heat treatments, may then be used to further optimize the phase length scales and microstructure hierarchy, if desired. In any additive manufacturing techniques, post-production processes such as heat treatment, light machining, surface finishing, coloring, stamping, or other finishing operations may be applied. Also, several additive manufactured parts may be joined together (e.g., sintered) chemically or physically to produce a final object.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A metal-alloy biphasic system containing at least a first metal phase and a second metal phase,
    wherein said first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
    wherein said second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein said second metal is different than said first metal;
    wherein said first metal phase is characterized by a first melting temperature, and wherein said second metal phase is characterized by a second melting temperature that is lower than said first melting temperature;
    wherein said metal-alloy biphasic system is characterized by a hierarchical microstructure containing a first length scale and a second length scale that is at least one order of magnitude smaller than said first length scale, wherein said first length scale is associated with said first metal phase, wherein said second length scale is also associated with said first metal phase, wherein said first length scale is from about 1 micron to about 100 microns, and wherein said second length scale is from about 0.01 microns to about 1 micron; and
    wherein said metal-alloy biphasic system is a solidification-based additively manufactured structure with a three-dimensional scalloped build pattern, wherein said additively manufactured structure has a microstructure containing a plurality of layers having differing primary growth-direction angles with respect to each other, wherein said microstructure has a crystallographic texture that is not solely oriented in an additive-manufacturing build direction, wherein said solidification-based additively manufactured structure is produced via melting and resolidification of both of said first metal phase and said second metal phase, and wherein said first metal phase and said second metal phase are immiscible at said second melting temperature.

2. The metal-alloy biphasic system of claim 1, wherein said metal-alloy biphasic system contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof.

3. The metal-alloy biphasic system of claim 1, wherein said second length scale is at least two orders of magnitude smaller than said first length scale.

4. The metal-alloy biphasic system of claim 1, wherein said metal-alloy biphasic system contains more than two distinct phases.

5. The metal-alloy biphasic system of claim 4, wherein said metal-alloy biphasic system contains a non-metal-containing phase.

6. The metal-alloy biphasic system of claim 1, wherein at least one of said first metal phase or said second metal phase forms a continuous network within said hierarchical microstructure.

7. The metal-alloy biphasic system of claim 1, wherein said first metal phase forms a continuous network within said hierarchical microstructure.

8. The metal-alloy biphasic system of claim 1, wherein said first metal phase forms a first continuous network within said hierarchical microstructure, and wherein said second metal phase forms a second continuous network within said hierarchical microstructure.

9. A metal-alloy continuous-biphasic system containing at least a first metal phase and a second metal phase,
wherein said first metal phase consists of a first metal $M^1$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing;
wherein said second metal phase consists of a second metal $M^2$ selected from the group consisting of W, Nb, V, Ta, Mo, Cr, Al, Ce, Bi, Zr, Hf, Ti, Mn, Fe, Co, Ni, Cu, Ag, Au, Zn, Sn, Pb, alloys thereof, and combinations of the foregoing, wherein said second metal is different than said first metal;
wherein said first metal phase is characterized by a first melting temperature, and wherein said second metal phase is characterized by a second melting temperature that is lower than said first melting temperature;
wherein said first metal phase forms a first continuous network within said metal-alloy continuous-biphasic system, wherein said first continuous network is characterized by a hierarchical microstructure having (i) a first length scale from about 1 micron to about 100 microns and (ii) a second length scale from about 0.01 microns to about 1 micron;
wherein said second metal phase forms a second continuous network within said metal-alloy continuous-biphasic system; and
wherein said metal-alloy continuous-biphasic system is a solidification-based additively manufactured structure with a three-dimensional scalloped build pattern, wherein said additively manufactured structure has a microstructure containing a plurality of layers having differing primary growth-direction angles with respect to each other, and wherein said microstructure has a crystallographic texture that is not solely oriented in an additive-manufacturing build direction, wherein said solidification-based additively manufactured structure is produced via melting and resolidification of both of said first metal phase and said second metal phase, and wherein said first metal phase and said second metal phase are immiscible at said second melting temperature.

10. The metal-alloy continuous-biphasic system of claim 9, wherein said metal-alloy continuous-biphasic system contains three or more distinct phases.

11. The metal-alloy continuous-biphasic system of claim 10, wherein said three or more distinct phases all form continuous networks within said metal-alloy continuous-biphasic system.

12. The metal-alloy continuous-biphasic system of claim 9, wherein said metal-alloy continuous-biphasic system contains $M^1$-$M^2$ selected from the group consisting of Nb—Cu, W—Cu, Ta—Cu, Al—Bi, Al—Sn, Al—Pb, W—Ce, Mo—Ce, Mo—Cu, Cr—Cu, V—Cu, and combinations thereof.

13. The metal-alloy continuous-biphasic system of claim 9, wherein the weight ratio of said first metal phase to said second metal phase is from about 0.01 to about 100.

14. The metal-alloy continuous-biphasic system of claim 9, wherein the weight ratio of said first metal phase to said second metal phase is from about 0.05 to about 20.

15. The metal-alloy continuous-biphasic system of claim 9, wherein said metal-alloy continuous-biphasic system contains a spatial gradient in the weight ratio of said first metal phase to said second metal phase.

16. The metal-alloy continuous-biphasic system of claim 9, wherein said metal-alloy continuous-biphasic system contains a non-metal phase.

* * * * *